(12) United States Patent
Heusinger

(10) Patent No.: US 7,594,562 B2
(45) Date of Patent: Sep. 29, 2009

(54) CONSTRUCTION MACHINE WITH ARTICULATED RUNNING GEAR

(75) Inventor: Jürgen Heusinger, Koblenz (DE)

(73) Assignee: BOMAG GmbH, Boppard (DE)

( * ) Notice: Subject to any disclaimer, the term of this patent is extended or adjusted under 35 U.S.C. 154(b) by 351 days.

(21) Appl. No.: 11/783,660

(22) Filed: Apr. 11, 2007

(65) Prior Publication Data

US 2007/0252411 A1    Nov. 1, 2007

(30) Foreign Application Priority Data

Apr. 13, 2006    (DE) ................. 10 2006 017 516

(51) Int. Cl.
  *B62D 33/06*    (2006.01)
  *B62D 33/063*   (2006.01)
(52) U.S. Cl. .................. 180/327; 180/89.13; 180/326; 180/89.12; 180/89.18; 296/190.04; 296/190.03
(58) Field of Classification Search .............. 180/326, 180/327, 89.1, 89.12, 89.13, 89.16, 89.18, 180/21, 418; 296/190.04, 190.03
See application file for complete search history.

(56) References Cited

U.S. PATENT DOCUMENTS

| | | | | |
|---|---|---|---|---|
| 3,252,546 A | * | 5/1966 | Allin, Jr. ..................... | 212/271 |
| 3,721,077 A | * | 3/1973 | Ven Der Lely ............... | 56/15.6 |
| 3,746,101 A | | 7/1973 | Takata | |
| 3,891,264 A | * | 6/1975 | Hunter et al. .......... | 296/190.04 |
| 4,018,473 A | * | 4/1977 | Chalupsky ............. | 296/190.04 |
| 4,364,438 A | * | 12/1982 | Pyle ........................... | 172/789 |
| 4,427,090 A | * | 1/1984 | Fredriksen et al. .......... | 180/327 |
| 5,199,193 A | * | 4/1993 | Akiba et al. .................. | 37/341 |
| 5,618,156 A | | 4/1997 | Brown | |
| 6,065,799 A | | 5/2000 | Suwabe | |

FOREIGN PATENT DOCUMENTS

| | | |
|---|---|---|
| DE | 3921875 A1 | 1/1991 |
| EP | 0233367 A | 8/1987 |
| EP | 1029982 A | 8/2000 |

* cited by examiner

*Primary Examiner*—Ruth Ilan
*Assistant Examiner*—Keith Frisby
(74) *Attorney, Agent, or Firm*—Baker & Hostetler LLP

(57) ABSTRACT

Construction machine in which an engine carrier is connected to a tool carrier via a joint to form an articulated running gear, the engine carrier having at least a first chassis axle and an engine for driving the construction machine and the tool carrier having at least a second chassis axle. The construction machine additionally has a driver's cab which is arranged between the engine and tool carrier and is attached, in accordance with the invention, displaceably to the tool carrier in such a way that it can be displaced along the longitudinal axis of the tool carrier and can thus be varied in its height position in such a way that it can be raised, for operating the construction machine, into a working position and lowered, for transporting the construction machine, into a transportation position.

15 Claims, 3 Drawing Sheets

US 7,594,562 B2

CONSTRUCTION MACHINE WITH ARTICULATED RUNNING GEAR

CROSS-REFERENCE TO RELATED APPLICATIONS

This application claims priority to German Patent Application No. DE 102006017516.6, filed Apr. 13, 2006, the disclosure of which is hereby incorporated by reference in its entirety.

FIELD OF THE TECHNOLOGY

The present invention relates to a construction machine in which an engine carrier is connected to a tool carrier via a joint to form an articulated running gear. The engine carrier has in this case at least a first chassis axle and an engine for driving the construction machine, whereas the tool carrier has at least a second chassis axle. Generic construction machines of this type additionally have a driver's cab arranged between the engine and tool carrier and contain a control stand for controlling the machine.

BACKGROUND OF THE INVENTION

These known construction machines are, in particular, what are known as soil stabilisers which are used for crushing and mixing binders into native soil material. For this purpose, a cutter with at least one rotating rotor, which has a large number of cutting bits, is attached to the tool carrier as a tool. These construction machines are also used or referred to as recyclers, as they allow layers of asphalt damaged, for example, in road construction to be broken up and crushed and new binders to be mixed in with these granules thus produced.

However, the generic construction machines can also be what are known as scrapers in which a bucket with a base-side blade and opening, located behind the blade, on the device carrier are attached to the tool carrier as a tool. These buckets are drawn, with the blade in front, over the native soil and scrape in the process a thin layer of soil which falls into the bucket chamber located behind the blade. These construction machines are therefore used for the rapid removal of layers of soil, as they move very rapidly and fill themselves. The construction machines can also be graders in which merely one blade, known as the "share", is fastened to the tool carrier as a tool. This blade is drawn over the native soil and produces thus desired surface inclinations. In addition, rollers can also be attached to the tool carrier as a tool, for example for compacting the soil or the like.

All of these construction machines are generally driven by at least one engine which drives, in turn, at least one chassis axle. Conventional, however, are also all-wheel-driven variations of these construction machines in which both the first chassis axle located on the engine carrier and the second chassis axle rotated on the tool carrier are driven. A plurality of axles can also be provided, in each case, both on the engine carrier and on the tool carrier.

A common feature of these construction machines equipped with articulated running gears is that they are relatively large devices which can usually be transported only with the aid of low loaders. On account of their extraordinary size, it is therefore generally necessary to reserve special low loaders for transportation or even to obtain special permits for the transportation of these construction machines. The transportation of these known construction machines with articulated running gears is therefore generally extremely complex, expensive and time-consuming.

On the other hand, these devices have to be effectively and also reliably operable, so the machines generally have a relatively large and highly reinforced driver's cabs to prevent roll-over; these cabs are inconsistent with an optimally compact design for transportation purposes.

SUMMARY OF THE INVENTION

The object of the invention is therefore to specify a construction machine of the above-mentioned type that can be transported simply and rapidly and at the same time allows improved operability with increased operational safety for the operator.

This object is achieved by a construction machine according to claim 1. Preferred developments of this construction machine according to the invention are described in the subclaims.

The construction machine according to the invention therefore differs from the construction machines referred to at the outset in that the driver's cab is attached displaceably to the tool carrier in such a way that it can be displaced along the longitudinal axis of the tool carrier and can thus be varied in its height position in such a way that it can be raised, for operating the construction machine, into a working position and lowered, for the purposes of transportation, into a transportation position. The longitudinal axis of the tool carrier extends in this case orthogonally to the second chassis axle, approximately through the centre thereof, up to the joint between the tool carrier and engine carrier.

On account of the displaceable mounting of the driver's cab, the driver has, during operation of the construction machine in the working position preferably raised further compared to conventional construction machines, a very good view onto the construction machine and also onto the tool located on the tool carrier. If the construction machine is to be transported, the driver's cab can then, in accordance with the invention, be lowered between the engine and tool carrier in such a way that the overall height of the construction machine is significantly reduced.

The reduction in height can in this case be in the range of approximately 1 m or even much more. Transportation of the construction machine according to the invention, despite the large dimensions thereof, therefore does not require a special low-reaching low loader and the time-consuming official special permits for transportation of the construction machine according to the invention are also dispensed with. The transportation is therefore, as a whole, more rapid and cost-effective, despite the fact that the operability of the device was improved by a further raised driver's cab in the operating state.

In order to achieve a particularly marked reduction in overall height for transportation, it is expedient to lower the driver's cab as far as possible into the interval between the engine and tool carrier, into a transportation position unsuitable for operation of the construction machine. Although the view from the driver's cab is restricted by the engine and tool or tool carrier, the greatest possible damming effect is achieved. This is especially beneficial in construction machines which are not to travel independently in public road traffic to their place of use but rather are transported thereto using low loaders.

In a preferred development of the construction machine, the driver's cab is located, in its working position, at least partially above a tool attached to the tool carrier. In other words, the devices for the displaceable mounting of the cab are guided very far toward the rear. This arrangement on the tool carrier is in contrast to the previously generally conventional assembly of the cab on the engine carrier or engine or the engine block thereof. However, this altered position has the advantage that the driver of the construction machine is located substantially very close to the tool, so his body sense, based on his own body, enables him to manoeuvre the construction machine effectively without having to look at the tool for this purpose. This effect is additionally intensified by the cab position, displaced still further backward via the tool.

In a further particularly preferred development of the construction machine according to the invention, the driver's cab can be displaced along the device carrier. This has the advantage that the device carrier can be used as a guide for the displacement movement of the driver's cab. It is especially advantageous in this regard if at least one guide rail for guiding the driver's cab is arranged on the device carrier. Expediently, however, a guide rail is located on each side of the carrier, thus allowing rotation of the cab on the carrier to be reliably prevented.

In a development, the transportation position of the driver's cab is chosen in such a way that the driver's cab is lowered between the engine and tool carrier in such a way that it at least substantially does not tower above them. This significantly reduces the overall height of the construction machine, so special low loaders are no longer necessary, as mentioned hereinbefore, for transporting the construction machine.

It is especially expedient in this regard for the driver's cab to be arranged, in the transportation position, as close as possible to the engine. The driver's cab fastened to the device carrier is therefore pushed up so close to the engine and lowered in such a way that gaps that are as small as possible remain between the engine and cab. It can also be expedient for the driver's cab to be slid, at least partially via the joint, between the engine carrier and tool carrier, for this also saves space.

It is especially advantageous if the device carrier is bent in a bridge-like manner. The device carrier can in this regard have oblique but straight side cheeks and a straight connection between these cheeks or itself be curved or bent continuously or only in certain regions. In any case, the device carrier itself defines the displacement direction of the driver's cab. In the side view of the construction machine, this then has the effect as if there were produced between the hill-like elevations of the tool carrier and the engine a trough into which the driver's cab can be lowered.

Expediently, at least some of the operating elements arranged in the driver's cab are switched off in the transportation position of the driver's cab. This promotes the operational safety of the construction machine, as accidental swivelling, for example, of the construction machine about its articulated running gear can in this way be prevented.

Particularly preferably, the driver's cab is displaced by a hydraulic drive. The hydraulic drive can, for example, consist of one or more hydraulic cylinders which either push or pull the driver's cab into its working position. The drive is expediently built onto the device carrier to save space.

The driver's cab can particularly expediently be secured at least in the working position and/or the transportation position. In the working position, securing of the driver's cab is advantageous at least if, for example, failure of the hydraulic systems might lead to slipping-off of the driver's cab. However, securing of the driver's cab in the transportation position can also be expedient, as unnecessary loading of the driver's cab caused by slipping back and forth during transportation can in this way be prevented. However, it is especially advantageous if the driver's cab can be secured in any desired position. The position of the cab can thus be adapted flexibly to any wish and any situation of use.

A hydraulic locking means is therefore preferably used for securing the driver's cab. This has the advantage that the driver's cab can be secured in any desired position and no mechanical catch members have, for example, to be operated manually. The cab is preferably secured without play in the respective position using a hydraulic catch block and a diaphragm such as, for example, a hose.

For improving the accident safety of the construction machine, the driver's cab has a roll-over bar. The roll-over bar protects the driver from falling articles or in the event of the construction machine overturning. However, it is especially expedient if, in addition to this roll-over protection means arranged in the driver's cab, the locking means of the driver's cab is detached in the event of an accident. The accident can in this case consist in an article falling onto the driver's cab or in the construction machine toppling and overturning. If, in a situation of this type, the locking means of the driver's cab is detached, the locking means can slide or be slid between the engine and tool carrier, so the impact caused by the recoil of the driver's cab is absorbed or cushioned.

However, it is particularly advantageous if the engine and tool frame form a protective chamber into which the driver's cab can be lowered in the event of an accident. The transportation position is in this case at the same time also a protective position. The engine and, in particular, its engine block cooperate in this case with the tool frame, which is generally very solid in its design, as an impact protection means for the driver's cab, as the driver's cab can be lowered between the two stable components into its transportation position. The engine and tool frame accordingly absorb the forces otherwise conventionally acting on a protruding driver's cab which is hardly deformed or is not deformed at all. The deformations of the driver's cab are obviously particularly slight if the driver's cab does not project beyond a notional line connecting the engine and tool frame, i.e. the tool frame is higher than the cab. However, even if the driver's cab projects beyond these components, this generally does not lead to serious injury to the driver if the protective chamber formed between the engine and tool carrier is sufficiently large to accommodate a human being.

The identification of an accident situation can in this case, for example, be detected by sensors which identify the toppling of the machine or by sensors which identify forces acting on the driver's cab, in collaboration with a safety monitoring system. However, it is also conceivable for the driver's cab to be lowered automatically in the event of a specific retaining pressure being exceeded in the hydraulic locking system. A high locking pressure of this type would, for example, be provided if a heavy article, such as for example a boulder, presses on the driver's cab and thus generates a marked increase in pressure in the hydraulic locking system. If a threshold value is then exceeded, the driver's cab slips downward. It therefore yields to and cushions the impact force.

BRIEF DESCRIPTION OF THE DRAWINGS

The invention will be described hereinafter in greater detail with reference to the embodiments illustrated in the drawings, in which.

DETAILED DESCRIPTION OF THE INVENTION

Figure 1:
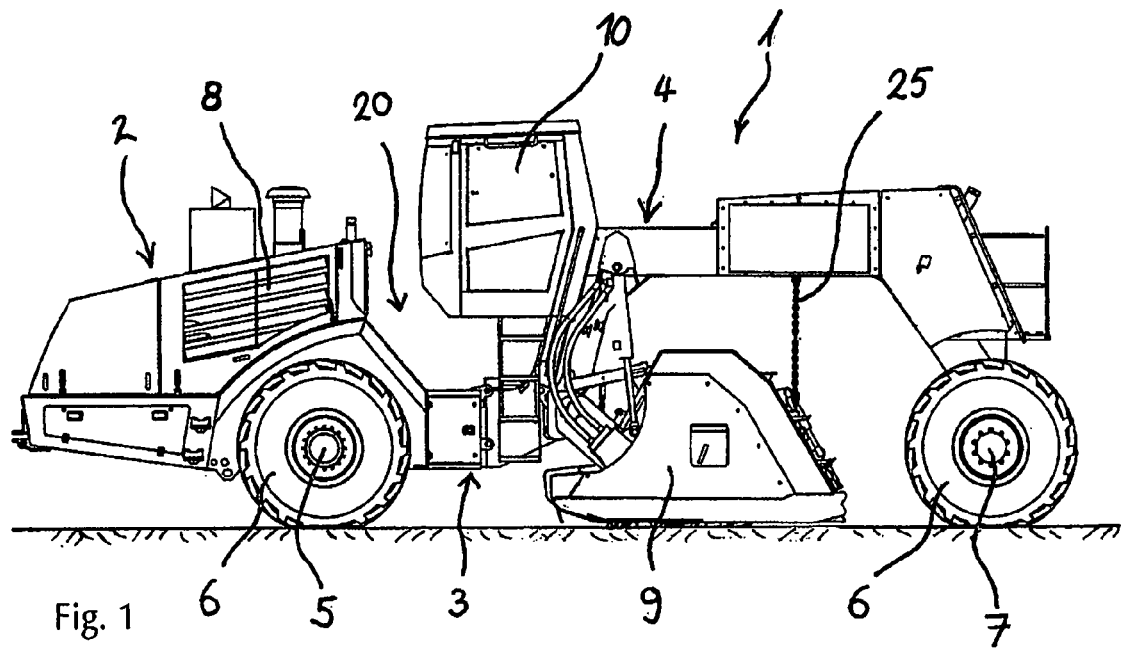
FIG. 1 is a schematic side view onto a construction machine according to the invention, the driver's cab of which is located in a raised working position.

The construction machine 1 shown in FIG. 1 is a stabiliser/recycler. The stabiliser/recycler has an engine carrier 2, a joint 3 and a tool carrier 4. The engine carrier 2 has, in turn, a first chassis axle 5 which is fitted at its two ends, in each case, with a wheel 6, and the tool carrier 4 has a second chassis axle 7 also fitted with two wheels 6 at its ends. The engine carrier 2 and the tool carrier 4 connected thereto via the joint 3 thus form an articulated running gear.

The engine carrier 2 carries an engine 8 which drives, in the embodiment shown in the present case, both the first chassis axle 5 of the engine carrier 2 and the second chassis axle 7 of the tool carrier 4. The vehicle is therefore an all-wheel-driven vehicle.

The tool carrier 4 is configured in a bridge-like manner like an inverted opening U. Attached thereto, at the suspensions 24 and 25, is a tool 9 which is a conventional tool for soil stabilisation and is also suitable for road recycling. These tools known per se generally have, in a housing, a rotating cutting roller acting on the soil, various systems for the injecting of bitumen, water or other active ingredients being arranged in the mixing chamber formed by the housing. The longitudinal axis of the tool carrier 4 extends transversely and centrally to the second chassis axle 7 through the joint 3.

A driver's cab 10 is located between the engine 8 and the tool carrier 4. As may also be seen from FIG. 3 to 6, the driver's cab is displaceably attached to the tool carrier 4 in such a way that the cab 10 can be displaced along the longitudinal axis of the device carrier 4 and thus be varied in its height position. In the case shown in FIG. 1, the driver's cab 10 is in its raised working position, whereas in the situation shown in FIG. 2 it has been slid into the lowered transportation position.

The displaceable mounting is achieved by two parallel guide rails 11 and 12 which are welded onto both sides of the tool carrier 4 and in which the driver's cab 10 can be displaced back and forth. These guide rails 11 and 12 are two U-shaped profiles made of steel, the backs of which are in each case fastened, in this case welded, to the side cheeks of the tool carrier 4, so rectangular sliding shoes 26 can move back and forth in the profiles 11, 12. In other words, the arms of the guide rails 11, 12 project outward. The guide rails 11 and 12 are both of equal length and inclined parallel to the longitudinal axis of the tool carrier 4 backwardly toward the trailing end of the vehicle of the construction machine 1. In FIG. 1, this vehicle end is located on the right-hand side. In the present case, the guide rails 11, 12 also extend parallel to the end face of the tool carrier 4 and directly along the front edges, formed by the side cheeks and the end face, of the tool carrier 4.

According to the invention, the two guide rails 11, 12 are attached in such a way that they do not project beyond the largest overall height of the construction machine 1. This is the highest point of the tool carrier 4, at the trailing end thereof, and the exhaust 17 and also the fan 16 of the engine 8. The delimitation of the maximum height displacement of the driver's cab 10 is thus obtained from the overall height of a component of the stabiliser 1, the maximum height of which cannot be changed or can be changed only with disproportionate expense. This does not necessarily have to be the exhaust 17, the fan 16 or the tool carrier 4, as it is conceivable for these also to be configured so as to be able to be lowered or folded down. However, in most cases, it will be the tool carrier 4 or the driver's cab 10 that defines a height delimitation of this type. In the present case, the driver's cab 10 is even higher in total that the guide rails 11, 12 are long.

Figure 3:
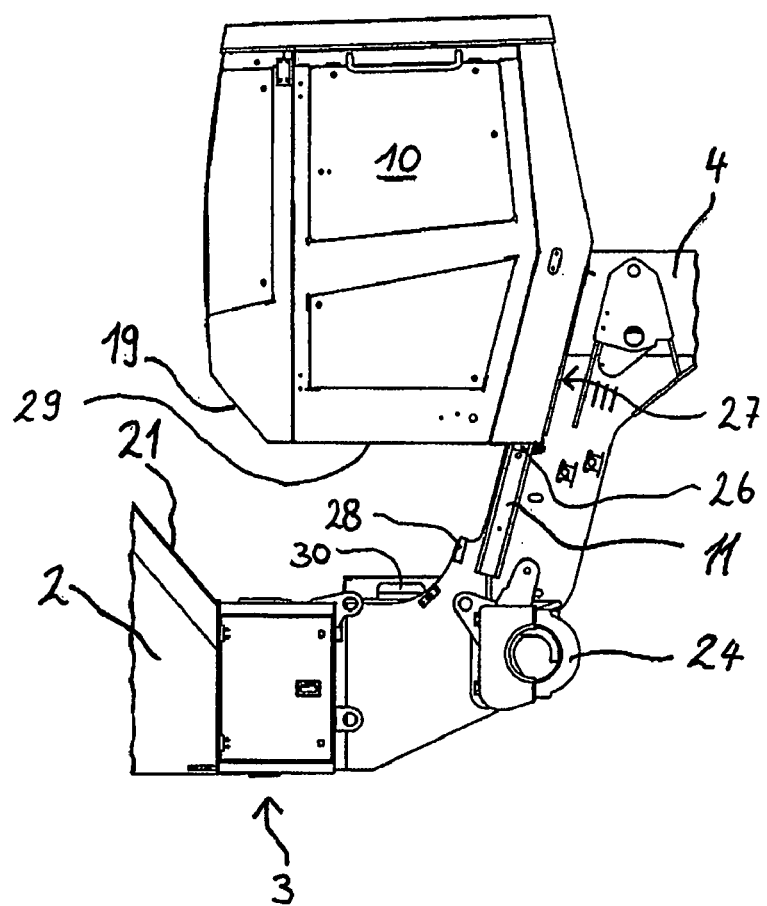
FIG. 3 is a schematic enlarged view of the driver's cab shown in FIG. 1.
Figure 4:
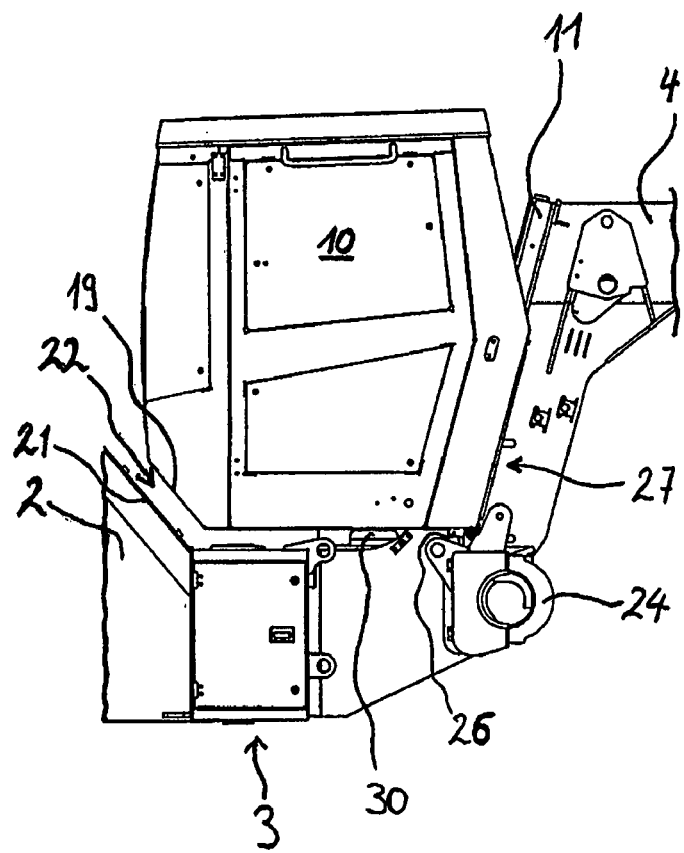
FIG. 4 is a schematic enlarged view of the driver's cab shown in FIG. 2.
Figure 5:
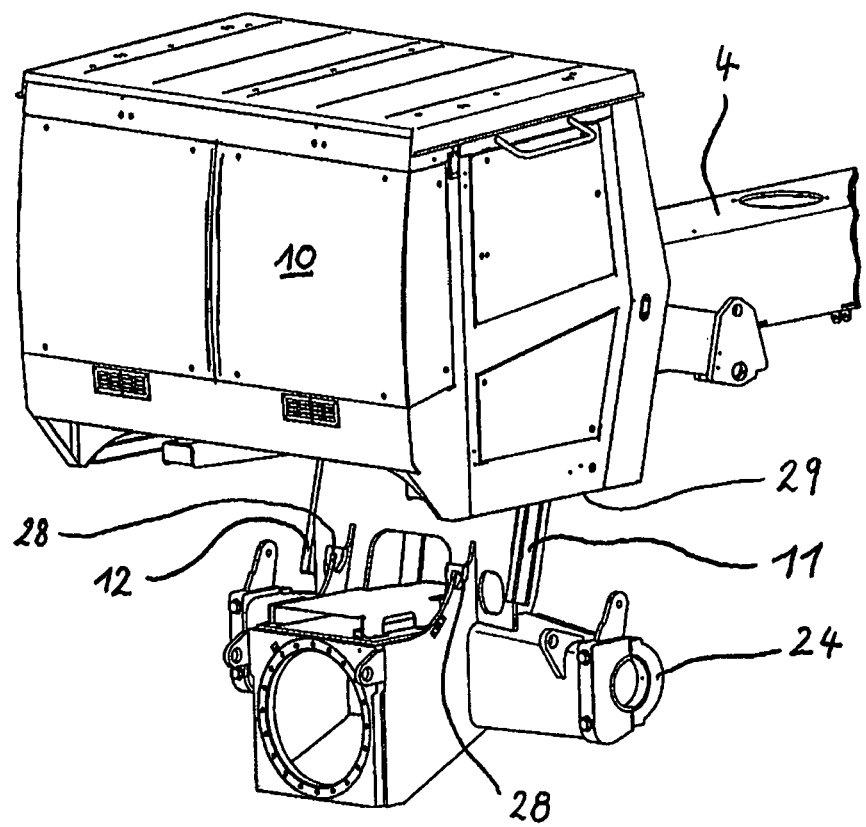
FIG. 5 is a schematic spatial view, obliquely from the front, of the driver's cab shown in FIG. 1.

The sliding shoes 26 are fastened to the rear wall 27 of the driver's cab 10 and can just be identified in FIGS. 3 and 4 at the lower right-hand edge of the cab 10, as they are for the most part concealed. The lower portion of the rear wall 27 of the driver's cab 10 bulges inward in a substantially U-shaped manner in order to enclose at least the region of the tool carrier 4 in which the guide rails 11, 12 are attached. In other words, the rear wall 27 encompasses the tool carrier 4, as shown in the present case at least in part. Screwed to the opposing arms of the U-shaped wall 27 is, in each case, an elongate sliding shoe 26 which is respectively guided in one of the guide rails 11, 12. The two opposing parallel sliding shoes 26 thus prevent derailing from the guide rails 11, 12 and, together therewith, rotation of the driver's cab 10 about the tool frame 4. It should be noted at this point that not just one but also two, three or more sliding shoes 26 can be arranged per guide rail 11, 12, for example in order to reduce friction.

As the guide rails 11, 12 extend parallel to the opening arm of the U-shaped tool frame 4, the lower portion of the rear wall 27, to which the cab is fastened, is backwardly inclined so as to correspond to the angle of inclination of the tool carrier arm. The angle between the base 29 of the driver's cab 10 and the rear wall 27 is therefore greater than 90°, so the base 29 extends as parallel as possible to the plane of the vehicle axles 5 and 7. In the present case, merely approximately the lower half of the rear wall 27 is bevelled in such a way and can be used for fastening the driver's cab 10 in order to prevent the width of the driver's cab 10 from becoming too great.

In the embodiment shown in the present case, the driver's cab 10 is displaced into the respectively desired position using two hydraulic cylinders 13 and 14. These hydraulic cylinders 13, 14 are powered by the hydraulic drive system of the stabiliser/recycler 1. The hydraulic cylinders 13, 14 are, in each case, attached to the tool carrier 4 parallel to the guide rails 11 and 12 and connected to the rear wall 27 of the driver's cab 10 via linking sheets 14. In the embodiment shown in the present case, the two hydraulic cylinders 13 and 14 draw the driver's cab 10 obliquely upwards into the working position, whereas when the hydraulic pressure decreases they allow the driver's cab 10 to slide downward, into the transportation position shown in FIG. 2 or FIG. 4, obliquely in the working direction of the machine, toward the front in the direction of the engine 8. The position of the upper fastening points of the hydraulic cylinders 13 and 14 also results, like the delimitation of the maximum height displacement of the driver's cab 10, from the maximum desired overall height of the construction machine 1, in the transportation configuration thereof, and has in any case to be below the highest point of the construction machine 1 which defines this height.

Figure 6:
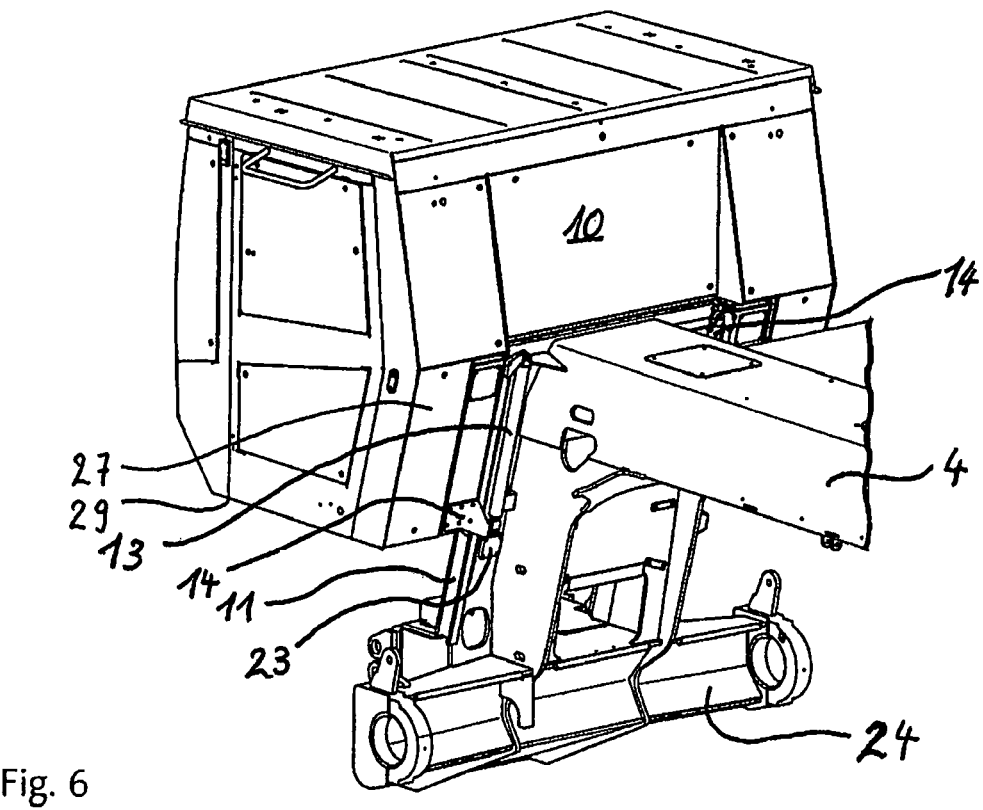
FIG. 6 is a schematic spatial view, obliquely from the rear, of the driver's cab shown in FIG. 1.

A hydraulic locking means is provided to hold the driver's cab 10 in the respectively desired position. For this purpose, a respective hydraulic catch block 23 is associated with each hydraulic cylinder 13, 14. The catch blocks 23 are located in this case at the lower end of each hydraulic cylinder 13, 14, as shown in FIG. 6.

In order to prevent the driver's cab 10 from becoming damaged on the tool carrier 4 or even from causing damage to the joint 3, on lowering into the transportation position, there are provided two steel stops 28 which are welded to the tool carrier 4 and raised relative to the joint 3 in such a way as to prevent the base 29 of the driver's cab 10 from impacting on the joint 3. Also provided on the tool carrier 4 is a rubber buffer 30 for cushioning the impact.

In the soil stabiliser 1 shown in the present case, the driver's cab 10 is arranged in such a way that it is drawn, counter to the direction of travel of the machine, obliquely to the rear, along the tool carrier 4, via the tool 9 attached thereto. This has the advantage that the driver, who is located in the cab 10, is able to judge very accurately, based on the position of the centre of gravity of his own body, the position of the tool 9 without having specially to look down for this purpose. At the same time, the raised working position greatly improves the all-round view from the cab and, in particular, the view onto the surroundings located in front of the machine 1. In addition, the backward displacement of the driver's cab 10 into the working position increases the distance between its front and the engine 8 so as to allow the tool carrier 4 and engine carrier 2 easily to be swivelled relative to each other, during use, in the joint 3, without the driver's cab 10 impeding this swivelling.

Figure 2:
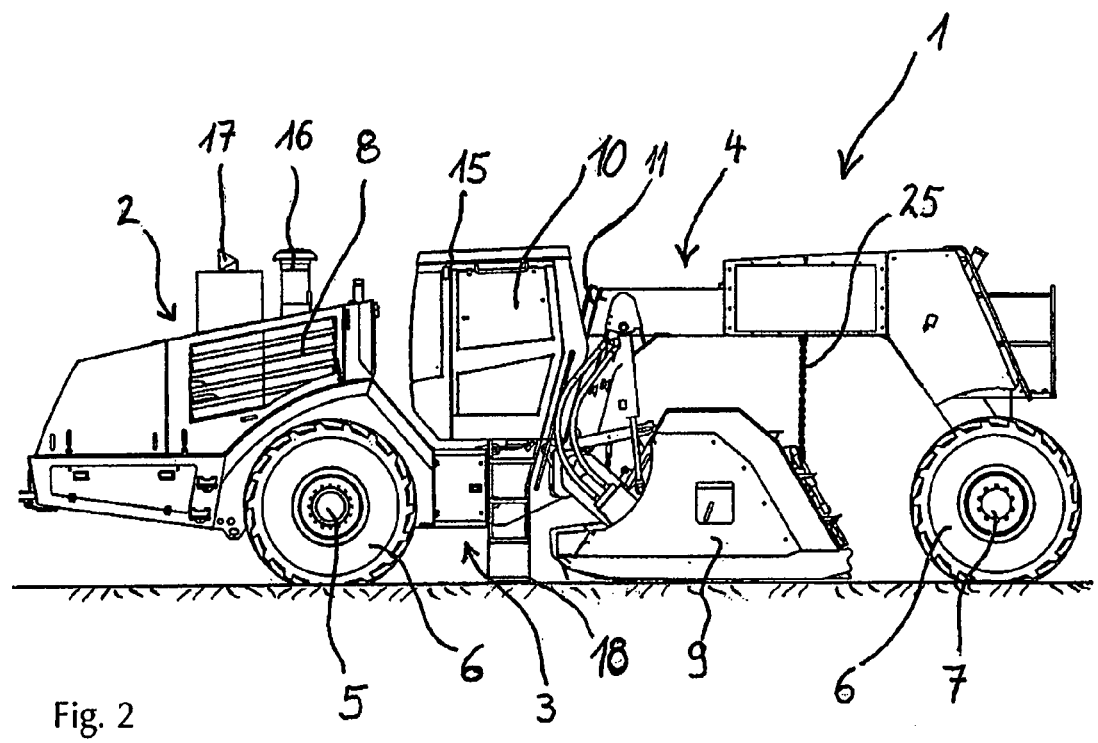
FIG. 2 is a schematic side view of the machine which is shown in FIG. 1 and the driver's cab of which is located in a lowered transportation position.

If the soil stabiliser/recycler 1 according to the invention is to be transported from one place of use to another, the driver's cab 10 is displaced into the construction machine, simply into the lowered transportation position, as shown in FIG. 2. The roof 15 of the driver's cab 10 is then flush with a notional connecting line running through the fan cowl 16, the exhaust 17, as the highest point of the engine 8, and also the highest point of the tool carrier 4 at the trailing end of the vehicle. The height of the construction machine 1 is thus telescoped to an absolute minimum dimension during transportation and a special low loader is no longer required to transport it.

The interval between the engine 8 and tool carrier 4 is in this case chosen to be as small as possible in order not unnecessarily to lengthen the overall length of the recycler 1. For this purpose, the lower front side 19 of the driver's cab 10 is in this case bevelled in such a way that it is adapted substantially to the widening in cross section 21 of the engine carrier 2. It is thus possible to move the driver's cab 10 right up close to the engine carrier 2 and the engine 8 fastened thereon. There is thus merely a very slight gap 22 between the downwardly bevelled front 19 of the driver's cab 10 and the top 21 of the engine carrier 2, as may also be seen from FIG. 4. In order to prevent damage to the driver's cab 10 or the construction machine 1, for example by accidental swivelling of the tool carrier 4 about the joint 3, at least those operating elements of the control stand located in the driver's cab 10 that relate to the steering and the driving of the construction machine 1 are switched off. However, at least the operating element required for raising the driver's cab 10 into the working position remains operational.

As may also easily be seen from FIG. 2, the lowerable driver's cab 10 also has the additional advantage that it is easier for the driver to climb up into the driver's cab 10, as in the transportation position shown in FIG. 2 the ladder 18 for climbing into the driver's cab already reaches down to the ground, whereas in the working position shown in FIG. 1 it does not reach this far.

A particularly advantageous aspect of the present invention is that the displacement of the driver's cab 10 along the tool carrier 4 obliquely toward the rear not only improves the facility of inspection and the transportation of the construction machine but also markedly increases the safety of the driver, located in the cab 10, of the stabiliser/recycler 1. The driver's cab 10 thus has a roll-over bar which is located in the interior and provides impact and roll-over protection; however, above all, the driver's cab 10 can, in a corresponding accident situation, be displaced in a safety chamber 20 formed between the engine 8 and the tool carrier 4. In a normal transportation situation, this safety chamber 20 is used for receiving the driver's cab 10. However, in an accident situation, for example if the construction machine 1 overturns, it serves as a survival chamber for the driver, as the solid engine block of the engine 8 and the solid tool carrier 4 substantially absorb the blow or impact on the cab 10.

The invention claimed is:

1. Construction machine, comprising:
    a tool carrier;
    an engine carrier connected to the tool carrier via a joint to form an articulated running gear, the engine carrier having at least a first chassis axle and an engine for driving the construction machine and the tool carrier having at least a second chassis axle; and
    a driver's cab arranged between the engine and tool carrier, and attached displaceably to the tool carrier in such a way that the driver's cab can be displaced along the longitudinal axis of the tool carrier and can thus be varied in its height position in such a way that it can be raised, for operating the construction machine, into a working position and lowered, for transporting the construction machine, into a transportation position.

2. Construction machine according to claim 1, wherein the driver's cab is located, in its working position, at least partially above a tool attached to the tool carrier.

3. Construction machine according to claim 1, wherein the driver's cab can be displaced along the tool carrier.

4. Construction machine according to claim 1, wherein at least one guide rail for guiding the driver's cab is arranged on the tool carrier.

5. Construction machine according to claim 1, wherein the driver's cab is lowered, in the transportation position, between the engine and tool carrier in such a way that it at least substantially does not tower above them.

6. Construction machine according to claim 1, wherein the driver's cab is arranged, in the transportation position, as close as possible to the engine.

7. Construction machine according to claim 1, wherein the driver's cab can be slid, at least partially via the joint, between the engine carrier and tool carrier.

8. Construction machine according to claim 1, wherein the tool carrier is bent in a bridge-like manner.

9. Construction machine according to claim 1, wherein at least some of the operating elements arranged in the driver's cab are switched off in the transportation position of the driver's cab.

10. Construction machine according to claim 1, wherein the driver's cab can be displaced by a hydraulic drive.

11. Construction machine according to claim 1, wherein the driver's cab can be secured at least in the working position and/or the transportation position.

12. Construction machine according to claim 1, wherein the driver's cab can be secured using a hydraulic locking means.

13. Construction machine according to claim 1, wherein the driver's cab has a roll-over bar.

14. Construction machine according to claim 1, wherein the locking means of the driver's cab is detached in the event of an accident.

15. Construction machine according to claim 1, wherein the engine and tool frame form a protective chamber into which the driver's cab can be lowered in the event of an accident.

* * * * *